United States Patent [19]

Goldstein et al.

[11] 3,734,469

[45] May 22, 1973

[54] REACTOR VESSEL AND UP-DOWN MIXER

[75] Inventors: Arnold M. Goldstein, Whippany, Edward Effron, Springfield, Jack M. Hochman, Boonton, all of N.J.

[73] Assignee: Esso Research and Engineering Company, Linden, N.J.

[22] Filed: Dec. 31, 1970

[21] Appl. No.: 103,181

[52] U.S. Cl. ........................................259/8, 165/109
[51] Int. Cl. ..................................................B01f 7/16
[58] Field of Search.................259/DIG. 10, 8, 182, 259/122, 111, 107, 108, 97, 109, 110; 165/109, 108, 106, 107

[56] References Cited

UNITED STATES PATENTS

| 2,766,391 | 10/1956 | Alspaugh | 259/8 |
| 3,544,280 | 12/1970 | Thomas | 165/107 |
| 263,172 | 8/1882 | Gubbins | 165/109 |
| 3,188,677 | 6/1965 | Jamison, Jr. | 15/246.5 |

FOREIGN PATENTS OR APPLICATIONS

| 801,078 | 12/1950 | Germany | 259/109 |
| 1,124,329 | 2/1962 | Germany | 259/182 |

*Primary Examiner*—Leon G. Machlin
*Attorney*—Manahan & Wohlers and F. Donald Paris

[57] ABSTRACT

A mixer comprising sets of multi-bladed 45° axial impellers for providing substantially perfect mixing in a cylindrical reactor vessel having an L/D ratio greater than one. A first set of impellers located closest the impeller shaft pump downward while a second set of impellers located outwardly from the first set of impellers pump upward enhancing the flow along the vessel walls.

2 Claims, 4 Drawing Figures

PATENTED MAY 22 1973 3,734,469
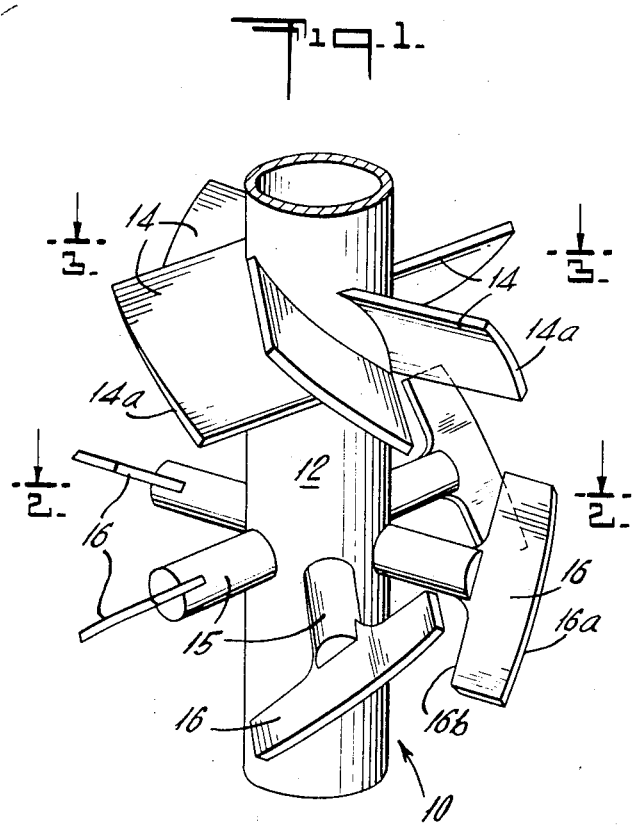
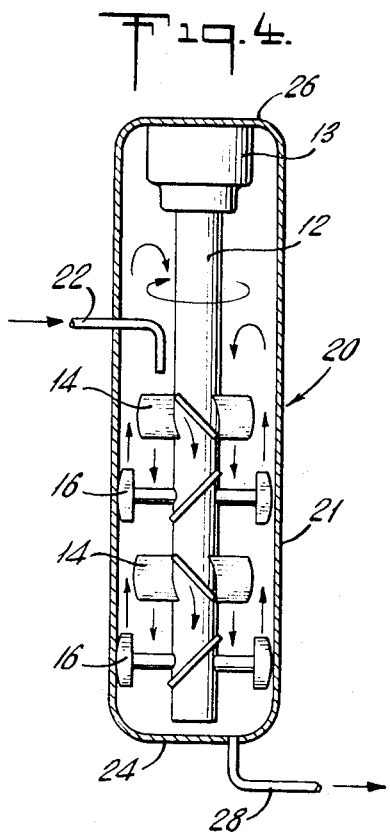
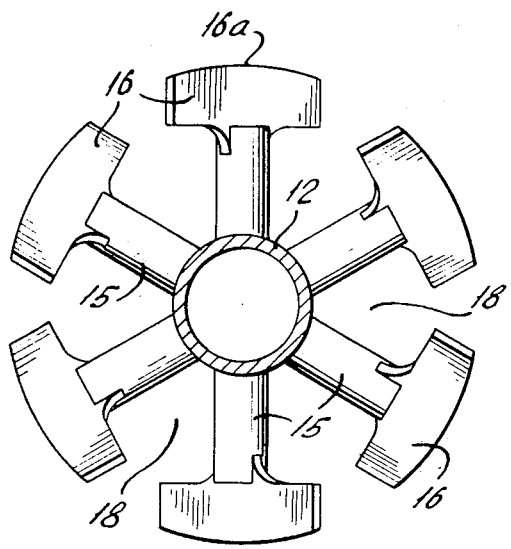
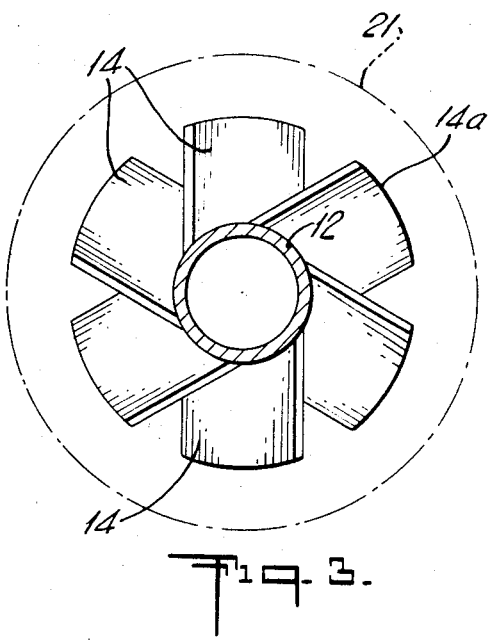
INVENTORS
ARNOLD M. GOLDSTEIN
EDWARD EFFRON
BY JACK M. HOCHMAN
F. Donald Paris
ATTORNEY

REACTOR VESSEL AND UP-DOWN MIXER

BACKGROUND OF INVENTION

The invention pertains to a reactor vessel having a novel mixing device. Particularly, such a reactor vessel and mixer may be used for rapid reactions at high pressure wherein polymeric materials are formed. One such application is in low density polyethylene production. In such reactions, it is important that the closest possible approach to perfect mixing be obtained. Thus, the configuration of the reactor vessel and the design of the mixer are extremely critical in obtaining good performance to thereby produce a high quality polymer product. However, due to the requirements for minimizing construction costs in high pressure reaction vessels, it may be desirable or necessary to use a reactor with a length/diameter (L/D) ratio greater than one. As the reactor L/D increases, it becomes more and more difficult to obtain the perfect mixing desired for rapid reactions and the product quality may be lowered. The design and operation of the mixing device thus becomes more critical as the L/D becomes larger. Test work indicates that conventional mixing devices such as single sets of 45° flat bladed impellers, marine propellers, or helical ribbon mixers which have been used in the past are not as effective as is desirable in approaching a perfectly mixed condition. A perfectly mixed reactor will have the same temperature from top to bottom. Large temperature differences, for example, of the order of 100° F., may actually occur in practice and these have been shown to be related to poor quality product. Correcting for such poor quality product may require a reduction in the production rate of a given reactor in order to obtain high quality product. Conversely, if no correction is made, a lower product quality results in a lower selling price and an overall reduction in the profitability of the plant. It has been clear that the performance of the mixing device is extremely important in the overall commercial success of the reaction system.

SUMMARY OF THE INVENTION

The present invention comprises a specially designed mixer which is utilized in combination with a chemical reactor having an L/D ratio normally greater than one. The object is to provide a very high internal recycle ratio. Typically, the objective is to provide a ratio of internal recirculation flow vs. reactor feed rate of approximately 40. To achieve such a recirculation/feed ratio, the mixer in a typical embodiment comprises spacing along the mixer shaft sets of multi-bladed 45° axial impellers. The sets of impellers are located along the mixer shaft so that the set of impellers located inwardly closest the shaft axis pump downward axially along the shaft, while the set of impellers located outwardly from the shaft axis and closest the reactor vessel wall pump upward thus enhancing the flow adjacent the walls. The inward impellers and the outward impellers coact to provide a high internal recirculation ratio, by virtue of the inward impellers pumping downwardly along the shaft, while the outward impellers pick up the flow at the bottom of the reactor vessel and return it to the top again along the vessel wall. The reactor feed is introduced by a special inlet nozzle which injects the feed into the recirculation flow axially along the shaft of the mixer.

In a typical configuration, a reactor having an $L/D = 4$, two sets of down-pumping impellers are used in combination with two or three sets of up-pumping impellers. The sets of down-pumping impellers and up-pumping impellers are alternately disposed along the mixer shaft. The size, the speed of rotation, the number and the pitch of the impeller blades, may be varied without departing from the spirit of the invention. These variables may be changed as required to suit the individual circumstances.

BRIEF DESCRIPTION OF THE DRAWINGS

The drawings will serve to show the typical configuration of the mixing impellers of the present invention and their application in a reactor vessel with an L/D greater than one. FIG. 1 is a perspective view of the impellers of the present invention illustrating the two types of impellers used, namely, one set of impellers located close to the drive shaft and a second set of impellers with the blades spaced outwardly of the first mentioned set of impellers.

FIG. 2 is a cross-sectional view taken substantially along the line 2—2 of FIG. 1 showing the outer set of blades.

FIG. 3 is a cross-sectional view taken substantially along the line 3—3 of FIG. 1 showing the inner set of impeller blades located closest to the shaft.

FIG. 4 is an elevation view illustrating the overall arrangement of a reactor vessel together with the impellers constructed and arranged according to the present invention.

DESCRIPTION OF THE PREFERRED EMBODIMENT

Referring to FIG. 1, the mixer 10 comprises a shaft 12, shown here as being hollow, but which may equally as well comprise a solid shaft. Attached to the shaft are one of each of the two types of impeller sets, generally designated 14 and 16. One or more pairs of impeller sets may be used in order to provide the desired agitation in any particular situation. Although shown as rigidly attached to the shaft, the sets of impellers may be welded to collars and positioned along the shaft by set screws in order to make possible the adjustments of location and/or number of the impeller sets. The set of impeller blades 14 shown attached to the upper portion of the shaft 12 of FIG. 1 includes six essentially flat and rectangular shaped blades attached directly to the mixer shaft 12. The blades shown in FIG. 1 are directly attached to the shaft in order to eliminate the possibility of bypassing flow along the shaft itself. When a solid shaft is used, the blades might be located slightly away from the shaft to simplify their attachment. The second set of impeller blades 16, illustrated by the lower set shown in FIG. 1, comprises six essentially flat and rectangular blades which are spaced outwardly from the shaft so that the nominal radius of the outer edges 14a of the inward blades 14 are essentially the same as the nominal radius of the inner edges 16b of the outward blades 16. Blades 16 are attached by means of tubular support 15 to the shaft 12. The supports 15 are made as small as possible to minimize interference with the flow of fluid created by blades 14. The supports 15 are shown as tubular but could be made in other shapes to assist the movement of fluid. Both sets of blades 14 and 16 are shown disposed at substantially 45° angles with the plane in which the blades are mounted. However, the corresponding ones of the blades in each of the sets are mounted to be substantially 90° apart, one being at a positive angle of 45° and the second at a negative angle of 45° thereby providing the flow from the inwardly located set of blades 14 to be in an opposite direction to that produced by the blades 16. This causes the blades to coact and creates a strong recirculation of fluid from top to bottom.

It will be understood that the choice of 45° flat blades has been made in order to provide a maximum movement of fluid with a minimum power input requirement to the shaft. The design of such blades is made for this purpose and does not necessarily indicate a rigid requirement. Other angles or blade shapes might be chosen as found necessary to provide the type of mixing or to fit the particular reactor configuration with which the impeller is to be used.

Turning to FIG. 2, it can be seen that the outer set of impeller blades 16 are attached to the shaft by the supports 15. It will be noted that while the impeller blades are substantially rectangular, they may be slightly rounded at their outer edges 16a in order to more closely conform to the diameter of the vessel within which they are to be located. Such rounding of the blade edges may be important in instances where the maximum circulation is desired and where the impellers therefore occupy a large portion of the reactor cross-sectional area. The space 18 located between supports 15 provides a passage for flow of fluid created by blades 14.

In FIG. 3, the innermost set of blades 14 are shown. As mentioned before, the blades 14 may be attached directly to the shaft as shown here, or they may be attached by a support close to the shaft.

In FIG. 4, a side view of a typical reactor vessel is shown illustrating the typical mixer application, showing its interaction with the vessel 20, the feed nozzle 22, and product withdrawal nozzle 28. The mixer shaft 12 may be driven by any suitable means, such as is shown in FIG. 4 as an internal motor 13. In this particular embodiment, two sets of each type of impeller blades (14 and 16) are illustrated, alternating sets of outward blades 16 with sets of inward blades 14. Alternately disposing the sets of blades along the shaft 12 is desirable in order to minimize the bypassing from one set of blades to the adjacent set and to provide a uniform motion of the liquid throughout the reactor vessel. It should be noted in FIG. 4, that the arrows illustrate the direction of flow which is obtained by each set of blades for clockwise rotation of the shaft. The inner blades 14 shown with this direction of shaft rotation pump fluid downwardly in an axial direction along the shaft 12. The fluid continues downward until it reaches the bottom of the reactor vessel 24 which blocks further downward movement, whereupon the fluid turns and travels upwardly along the inside reactor wall 21 being assisted by the set of outwardly located blades 16. As the recirculating reaction mixture reaches the top of the reactor 26, it is turned inwardly towards the shaft and is pumped down again by the inwardly located set of blades 14. The feed nozzle 22 which is located proximate to the shaft, introduces fresh feed fluid adjacent the shaft, thereby joining the circulating fluid so as to add its kinetic energy to the recirculation of fluid. Product from the chemical reaction leaves the vessel 20 through outlet nozzle 28. Other nozzle locations may be used to take particular advantage of the recirculation created by the up/down mixer. As has been mentioned heretofore, the objective of the novel agitator disclosed herein is to provide a high internal recirculation ratio expressed as circulation versus feed rate. This may be desirably in the range of 20-60.

After having disclosed the preferred embodiment, the specific details of which may be varied without departing from the spirit of the invention, the scope of the invention is set forth in the claims as follows.

What is claimed is:

1. An apparatus for carrying out high pressure continuous chemical reactions wherein feed is continually injected and product continually withdrawn comprising in combination:
   a. a cylindrical reactor vessel having a vertical axis and having closed ends and a length to diameter ratio greater than one;
   b. a driven shaft rotatably mounted on one of said closed ends and located on said axis;
   c. at least a first plurality of radially extending identical oppositely arranged impeller blades attached to said shaft in a plane perpendicular to said shaft, said blades of said first plurality being positioned at a positive angle with their mounting plane, whereby rotation of said shaft creates fluid movement axially in a first direction along the shaft;
   d. at least a second plurality of radially extending identical oppositely arranged impeller blades attached to said shaft in a plane perpendicular to said shaft, said blades being positioned at a negative angle with their mounting plane, and located radially outwardly beyond the first set of impeller blades and attached to said shaft by small supports thereby defining flow path between said supports for fluid impelled therethrough by said first plurality of blades, the rotation of said shaft creating fluid movement in a second direction opposite to said first direction and parallel to said vessel wall, complementing thereby the fluid movement created in said first direction axially to the shaft by said first set of impeller blades, said arrangement being dynamically balanced to permit such rotation as to thereby produce a ratio of recirculation to feed rate within the range of 20–60.

2. The apparatus of claim 1, wherein feed is injected adjacent the shaft, thereby joining the circulating fluid so as to add its kinetic energy to the recirculation.

* * * * *